(12) United States Patent
Fischer et al.

(10) Patent No.: US 12,045,125 B2
(45) Date of Patent: Jul. 23, 2024

(54) ALERT AGGREGATION AND HEALTH ISSUES PROCESSING IN A CLOUD ENVIRONMENT

(71) Applicant: SAP SE, Walldorf (DE)

(72) Inventors: Felix Fischer, Leimen (DE); Yannick Ulmrich, Leimen (DE); Tilmann Haeberle, Wiesloch (DE); Premchand Nutakki, Wiesloch (DE); Jens Berger, Moritzburg (DE); Andreas Reischmann, Heidelberg (DE); Badri Narayan, Bangalore (IN)

(73) Assignee: SAP SE, Walldorf (DE)

( * ) Notice: Subject to any disclaimer, the term of this patent is extended or adjusted under 35 U.S.C. 154(b) by 77 days.

(21) Appl. No.: 17/987,503

(22) Filed: Nov. 15, 2022

(65) Prior Publication Data

US 2024/0160517 A1 May 16, 2024

(51) Int. Cl.
*G06F 11/07* (2006.01)

(52) U.S. Cl.
CPC ........ *G06F 11/079* (2013.01); *G06F 11/0769* (2013.01); *G06F 11/0781* (2013.01)

(58) Field of Classification Search
CPC ............... G06F 11/079; G06F 11/0793; H04L 41/0631; H04L 41/5074
See application file for complete search history.

(56) References Cited

U.S. PATENT DOCUMENTS

| | | | |
|---|---|---|---|
| 8,112,747 B2 | 2/2012 | Haeberle et al. | |
| 8,209,669 B2 | 6/2012 | Schneider et al. | |
| 8,234,633 B2 | 7/2012 | Schneider et al. | |
| 8,296,311 B2 | 10/2012 | Rapp et al. | |
| 8,380,549 B2 | 2/2013 | Haeberle et al. | |
| 8,527,542 B2 | 9/2013 | Haeberle et al. | |
| 8,627,321 B2 | 1/2014 | Teichmann et al. | |
| 8,959,063 B2 | 2/2015 | Haeberle et al. | |
| 11,397,634 B1 * | 7/2022 | Monga | G06F 11/3006 |
| 2003/0225748 A1 | 12/2003 | Haeberle | |
| 2007/0164849 A1 | 7/2007 | Haeberle et al. | |
| 2007/0174731 A1 | 7/2007 | Haeberle et al. | |
| 2012/0047079 A1 | 2/2012 | Biesemann et al. | |

(Continued)

OTHER PUBLICATIONS

U.S. Appl. No. 17/837,211, Reischmann et al., filed Jun. 10, 2022.

*Primary Examiner* — Yolanda L Wilson (74) *Attorney, Agent, or Firm* — Fish & Richardson P.C.

(57) ABSTRACT

The present disclosure relates to computer-implemented methods, software, and systems for obtaining incoming alerts associated with tickets generated for health status issues identified by applications for central components of a cloud platform environment. The obtained incoming alerts are aggregated to determine a root cause ticket. A set of incoming alerts is associated with a first central component running at a first data center from one or more data centers of the cloud platform environment. The set of incoming alerts are generated based on a set of tickets logged at a first ticketing system of the first data center by one or more applications running on the first data center. A root cause ticket is generated to combine the set of tickets corresponding to the set of incoming alerts, and the root cause ticket identifies the first central component as associated with a first health status issue.

20 Claims, 6 Drawing Sheets

(56) References Cited

U.S. PATENT DOCUMENTS

| | | | |
|---|---|---|---|
| 2014/0129536 A1* | 5/2014 | Anand | G06F 16/345 |
| | | | 707/723 |
| 2014/0379780 A1 | 12/2014 | Scheyter et al. | |
| 2015/0280968 A1* | 10/2015 | Gates | G06F 11/0769 |
| | | | 714/37 |
| 2021/0373986 A1 | 12/2021 | Kruempelmann et al. | |
| 2022/0019954 A1* | 1/2022 | Andina Silva | G06F 11/0766 |
| 2022/0066852 A1* | 3/2022 | Ramanujan | G06F 11/0793 |
| 2023/0016199 A1* | 1/2023 | Jividen | H04L 41/12 |

\* cited by examiner

ALERT AGGREGATION AND HEALTH ISSUES PROCESSING IN A CLOUD ENVIRONMENT

TECHNICAL FIELD

The present disclosure relates to computer-implemented methods, software, and systems for execution of alert processing for technical issues identified in a cloud environment.

BACKGROUND

Software complexity is increasing and causes changes to lifecycle management and maintenance of software applications and platform systems. Customer's needs are transforming, with increased requests for flexibility in terms of processes and landscapes, and also high availability to access software resources provided by the underlying platform infrastructure. Cloud environments may experience network connectivity disruptions, hardware failures, and other technical issues affecting responsiveness of running software applications, services, and databases. Disruptions at the cloud environments may be associated with disruptions of services provided to external entities by the databases, applications, services, and/or end users.

SUMMARY

The present disclosure involves systems, software, and computer implemented methods for data processing to identify root cause issues in central components running in the cloud platform environment.

One example method may include operations such as: obtaining incoming alerts associated with tickets generated for health status issues identified by applications for one or more central components of a cloud platform environment, wherein a ticket is logged at a ticketing system by an application to identify a health status issue for a central component running at a respective data center of the cloud platform environment where the application is running; aggregating the obtained incoming alerts to determine a root cause ticket, wherein a set of incoming alerts is associated with a first central component running at a first data center from one or more data centers of the cloud platform environment, and wherein the set of incoming alerts are generated based on a set of tickets logged at a first ticketing system of the first data center by one or more applications running on the first data center; and generating a root cause ticket to be used at the first ticketing system, wherein the root cause ticket is generated to combine the set of tickets corresponding to the set of incoming alerts, and wherein the root cause ticket identifies the first central component as associated with a first health status issue.

In some instances, the method can include logging tickets, by a first application running on the data center, for one or more central component that runs on the same data center as the first application. At least a portion of the tickets can be associated with the first central component. The incoming alerts can be obtained according to a predefined schedule for pulling data from one or more ticketing systems associated with the one or more data centers of the cloud platform environment.

In some instances, the one or more central components can include at least one of a mail server, a data storage server, a communication service, and a document service.

In some instances, the method can include logging, at the first ticketing system and by a first application running on the first data center, a ticket for an experienced network outage at a first central component based on a failure in execution of an invoked service provided by the first central component running on the first data center.

In some instances, a ticket logged at a ticketing system can include data for an application that had logged the ticket and a central component of a respective data center that have the health status issue, and wherein the application, the ticket, and the central component are each identified in the data by respective unique identifiers.

In some instances, the obtained incoming alerts are aggregated to define one or more sets of incoming alerts, each set being associated with a common central component, when (i) the set of incoming alerts all identify the common central component as experiencing a health status issue and (ii) a number of the incoming alerts within the set exceeds a predetermined threshold value.

In some instances, the example method can include updating the first ticketing system of the first data center to store the root cause ticket as a primary ticket that is linked to the set of tickets, where the other tickets in the set of tickets are stored as child tickets in a hierarchical structure.

In some instances, the example method can include updating the first ticketing system of the first data center to store the root cause ticket as a primary ticket to substitute the set of tickets that were combined.

In some instances, the example method can include processing the root cause ticket stored at the first ticketing system to perform recovery actions at the first central component.

In some instances, the example method can include continuously logging tickets for the first central component of the one or more components until the ticketing system stores a root cause ticket as an aggregation of tickets for the first central component.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes various tools and techniques for identifying root cause issues in central components running in the cloud platform environment.

In some implementations, a cloud platform can include multiple data centers (or availability zones) that host applications and/or systems. The cloud platform can provide central components (e.g., platform services, core services, centralized storage systems, others) at each or some of the data centers, where the central components provide shared operations and functionality to the applications and systems associated with the particular cloud platform. In some implementations, applications running at a given data center (or availability zone) can consume services from one or more central components running at that data center. The applications that can run on the cloud platform can include software applications, application systems, application services, databases, storage, or other entities that can run on the underlying infrastructure of the cloud platform.

In some implementations, applications running at one data center consume services and resources from central components running at the same data center. In some implementations, an application running at a data center of the cloud platform can be communicatively coupled with some or all of the central components at that data center. In some implementations, an application running at one data center can consume services from a central component at another data center.

In some instances, a cloud platform may experience disruptions in the network connectivity or availability. Such disruptions may be relevant for certain portions of the cloud platform (e.g., a given data center or a set of data centers) or at particular entities running on the cloud platform (e.g., applications or services). The disruptions can be caused by various reasons and some issues may propagate to other portions or entities on the cloud platform based on inheritance due to interconnections. For example, if an application's execution is dependent on logic executed at another entity running at a data center that is having a network outage, the application can also experience downtime or other disruptions, limited functionality, or errors.

In some instances, a disruption may be caused by a failure in the underlying hardware and/or infrastructure where the cloud platform is hosted. The disruptions may affect part of or the whole of the cloud platform. In some instances, the disruptions may affect some or all connection types associated with the cloud platform, such as internal connections between entities on the same data center, between entities across different data centers, and external connectivity to instances at other environments outside the cloud platform.

A disruption in the connectivity may be associated with an outage having a particular scope and affecting connections of certain type(s) (e.g., some or all of the connection types) associated with the cloud platform. In some instances, a disruption in the network connectivity at a cloud platform may affect the execution of entities including applications, services, service components, and databases, as well as other entities that can be hosted on the cloud platform. In some of those instances, a disruption in the network connectivity may result in the unavailability of services and/or communication gaps that can lead to poor performance of platform provided services. Even a disruption to a single aspect of the cloud platform or availability zone may cause issues that reverberate throughout related applications, services, and systems.

In some instances, applications, services, and databases, among other entities that can be hosted in a cloud environment, may provide services for consumption within or outside a cloud platform. Entities running on the cloud platform may execute logic that include processing received requests and providing resources or data, dispatching received requests to other entities, querying database entities, and accessing external resources to gather data or to request services, among other examples of implemented processing logic at running entities on the cloud platform. For example, an application may execute processes and access a database to provide services to end-users. In order to provide services with high availability, the entities running on the cloud platform have to be accessible from the outside, able to access external services, resources, or other entities, and able to communicate with other entities running within the same cloud platform. Thus, if a service experience issues, such as network connectivity issues, quality of the services provided by entities running on the cloud platform may be affected. To maintain applications, services, and database(s) having a requirement for high availability, the cloud platform can be provided with tools and techniques to identify issues, determine whether recovery measures are necessary and available, and invoke logic to perform a recovery operation that can support recovery from the identified issue.

In some implementations, the performance of applications running on a cloud platform can be tracked and tickets (or issue data) can be logged in a tracking system (e.g., a ticketing system) to collect data for experienced health issues. In some implementations, the tracked issue data can be processed (e.g., by a recovery service or a system administrator) to determine recovery actions to remedy issues experienced at relevant applications.

In some implementations, the experienced health issues by an application running at a data center of a cloud platform can be associated with internal application issues, such as bugs or issues of the implemented application logic, or caused due to disruptions (or interruptions) in the services provided by one or more central components that are invoked by the application.

For example, if a given service that is provided by an application depends on execution of an operation at a central component that is experiencing a network outage, the application would not be able to provide the service and may report a health status issue. In some instances, that health status issue can be tracked as a ticket in a ticketing system logging data for issues experienced by applications at a given data center. The ticket data from the ticketing system can be used to determine subsequent actions to remedy the experienced health issues and provide high availability and smooth service performance by the applications running on the cloud platform.

In some implementations, the instances running on the cloud platform including central components and/or individual applications can experience health issues, such as network failures, service disruptions, or connectivity issues, among other examples. For example, while different applications can track separate issues (e.g., as tickets at a ticketing system of a data center), the root causes for those issues can be the same. For example, a central component consumed by all of the applications, or one of its individual components or functionality, may be experiencing downtime. Thus, issues experienced by a central component can be propagated to other entities running on the cloud platform. For example, if one component is consuming services from other components, and the latter component experiences technical issues, connectivity issues, or other health issues, those issues would be inherently noticed by and affect the first component that consumes the services.

In some implementations, identifying a root cause of issues for multiple logged tickets for tracked issues by different applications can improve the resolution process for recovering the identified issues. If tickets are processed individually, and two or more applications had identified issues based on an inherent issue from a common central component consumed by both applications, the processing time of those tickets would be higher compared to the time needed to process one ticket that identifies the root cause of the issues—that is, the common central component.

Figure 1:
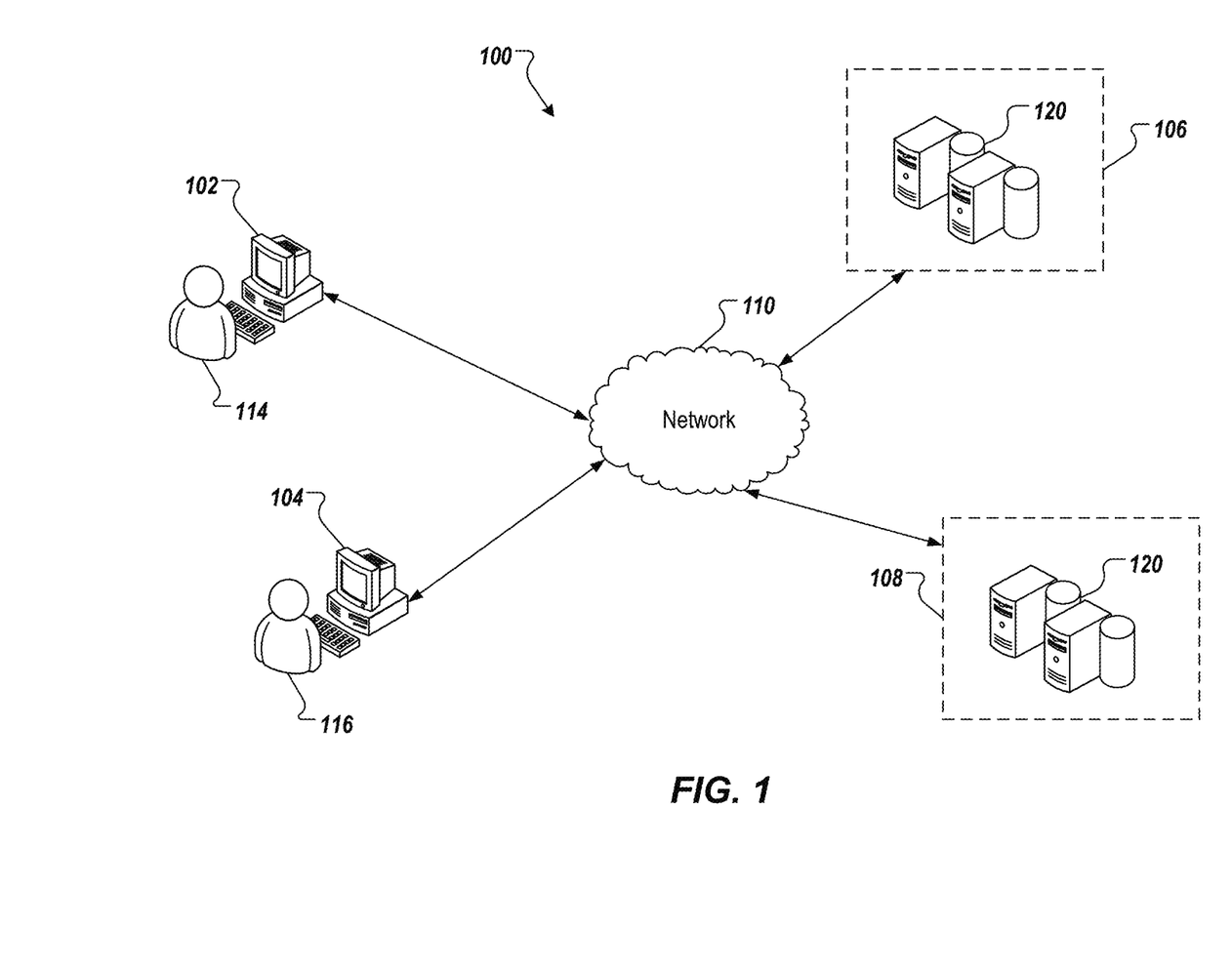
FIG. 1 illustrates an example computer system architecture that can be used to execute implementations of the present disclosure.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. In some implementations, the cloud environment 106 and the cloud environment 108 can be considered as two data centers (or availability zones) of one cloud platform. In those instances, the cloud platform can be called a multi-availability zone platform. The data centers can be instantiated at different geographical locations to leverage data distribution, data persistency, and high availability.

The client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on virtual machines (VMs) hosted on cloud infrastructure. In some instances, one application and/or service can run as multiple application instances on multiple corresponding VMs, where each instance is running on a corresponding VM. In some instances, a service hosted on the cloud can include service components that execute specific tasks for maintaining performance of the service. Each of the instances of the service may include a corresponding instance of each service component. In some case, the service components can be associated with the core or central services provided by the cloud platform.

In the cloud environment 106, a service can run at a data center (or cluster, or an availability zone) of the cloud environment 106 to provide end-user services, which can include, for example, services associated with requests sent through the network 110 from user 114 (or user 116) over device 102 (or device 104). The applications and the databases that are running in the cloud environment 106 can be designed, developed, executed, and maintained in relation to different customers and based on configured accounts that define process execution in relation to the applications and the database.

In some instances, the cloud environment 106 may be configured in a multiple availability zone architecture. The cloud environment 106 may be configured to include multiple availability zones where one application may include multiple instances running in corresponding multiple availability zones. By executing applications, services, databases, and other examples of entities that can run on cloud platform in a multiple availability zone setup, high availability for provided services and data is maintained. Maintaining a cloud platform with multiple availability zones supports providing low-latency network connectivity between different instances of applications executed at multiple zones. In some implementation, central components providing core platform services, central customer services, or specialized platform services can be consumed by customer application that are run in the cloud environment 106.

In some instances, the cloud environments 106 and/or 108 may host applications, service, databases, other, which are associated with different customers and/or accounts, or with the platform provider, and may be configured to interact in a particular way. In some implementations, hosted applications, services, and database, can consume services provided by other applications, services, and databases thus forming a process chain and interconnection during process execution. Such communicatively coupled applications may experience technical issues that originate from their individual implemented logic or based on issues experienced during communication with other entities that they consume (e.g., connectivity issues, performance issues, downtime, hardware failure, others).

Figure 2:
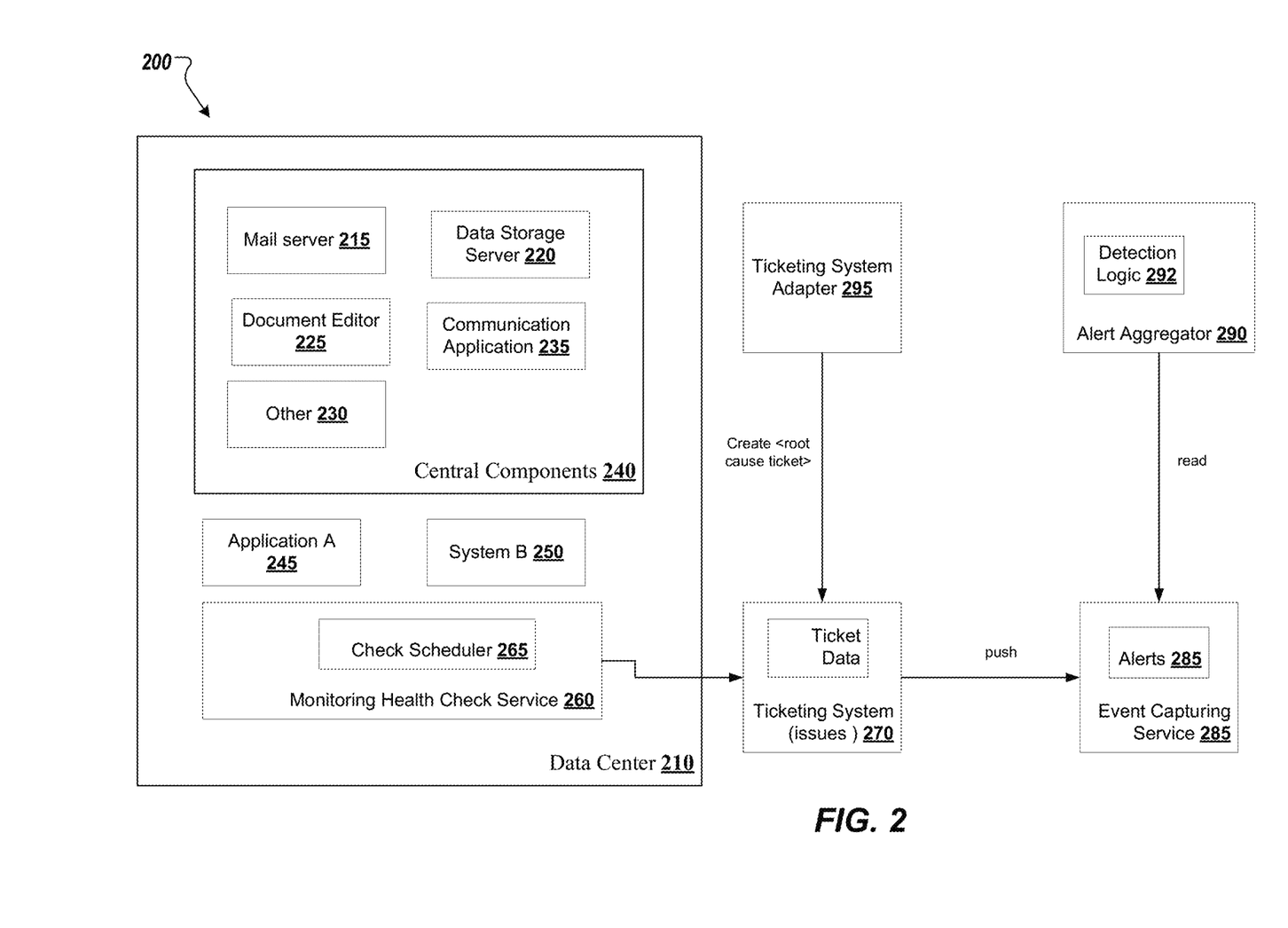
FIG. 2 is a block diagram for an example cloud platform environment configured with an alert aggregator to identify root cause issues in central components running in the cloud platform environment in accordance with implementations of the present disclosure.

FIG. 2 is a block diagram for an example cloud platform environment 200 that is configured with an alert aggregator that performs data processing to identify root cause issues in central components running in the cloud platform environment in accordance with implementations of the present disclosure.

In some instances, the cloud platform environment 200 may be similar to the cloud environment 106 and/or the cloud environment 108 of FIG. 1. The cloud platform environment 200 may be configured as one physical or virtual node hosted at one physical location. In some instances, the cloud platform environment 200 may also be configured in a multiple availability zone setup including multiple data centers, where data center 210 is one of multiple data centers part of the cloud environment 200 (the other data centers are not presented on FIG. 2). The other data centers part of the cloud environment 200 can be substantially the same as the data center 210 described below. In some instances, the cloud platform environment 200 can be a single availability zone cloud platform.

In some implementations, the data center 210 includes central components 240 that include applications and/or services that can be provided at the data center 210 for consumption by other applications, for example, customer applications. The central components 240 include a mail server 215, a document editor 225, a data storage server 220, and a communication application 235, as well as other applications that can provide services that can be incorporated into or used as part of the logic of entities instantiated on the data center 210, for example, for particular customer. These are example central components—other suitable components can also be provided by the cloud platform environment 200 for use by platform applications and systems run by customers.

In some implementations, Application A 245 and System B 250 are provided on the data center 210 and consume the platform resources of the cloud platform environment 200 and other services from the central components 240.

In some implementations, the data center 210 includes a monitoring health check service 260 that is instantiated to monitor applications and/or systems, as well as other entities executed on the data center 210, to log health issues experienced by those entities. In some instances, the monitoring health check service 260 can perform health checks to entities, such as Application A 245 and System B 250, according to a defined check schedule, for example, every 15 minutes, every day at 0800 am PST, or other consistent or varying schedules. The health checks that can be executed by the monitoring health check service can be performed with regular time intervals in some instances, and can be executed on individual application/system level. Health checks may also be event-based, as well as manually initiated. When a health check fails, a ticket can be logged at a ticketing system 270 for the application and/or system that experienced the issue.

In some implementations, the ticketing system 270 can store data for experienced issues by various application (or other entities) running on the data center 210. In some instances, the ticketing system 270 can be shared between multiple data centers of the cloud platform environment 200. In some implementations, the ticketing system 270 stores ticket data for experienced issues. Some of the tickets are associated with issues related to central components from the central components 240. In some implementations, tickets related to central components include identification data for the application or system that is associated with the experienced health issue, an identifier for the central component, a time stamp of the logged ticket (or when the issue was tracked by the monitoring health check service 260), a ticket identifier that can be an unique identification number, and a data center relevant for the experienced issues (e.g., the data center where the application that logged the ticket is running).

In some implementations, alerts 285 are created at an event capturing service 280 based on pushing stored ticket data from the ticketing system 270 to the event capturing service 280. For example, the event capturing service 280 can be such as Azure EventHub by SAP SE. The alerts 285 can be created to correspond to logged tickets at the ticketing system 270. In some implementations, data such as health status data (or health check data) stored in tickets can be pushed to the event capturing service 280, where such data can be used to determine issues or outages. The event capturing service 280 can support obtaining data from multiple sources (or customer groups), where data can be retained or persisted by the event capturing service 280 for a predefined time period (e.g., at least three (3) days) and such data can be used as a streaming source for aggregation logic that can be applied over the data (e.g., by an alert aggregator 290). In some implementations, the event capturing service 280 can support email notifications to provide notifications when no events have been received from any related system for a specified time period.

Figure 4A:
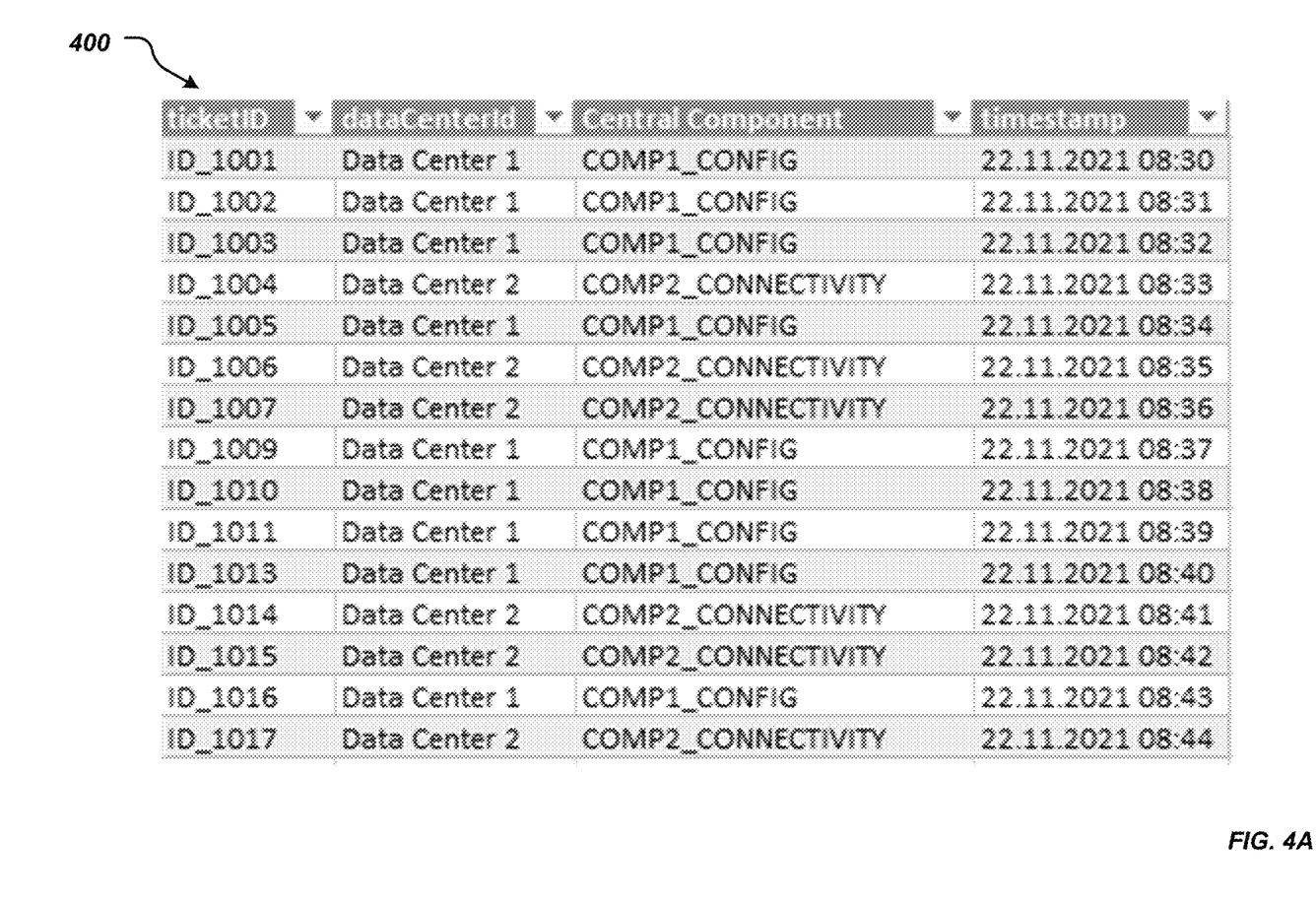
FIG. 4A is an example data set including data for ticket alerts associated with different data centers and different central components in accordance with implementations of the present disclosure.

FIG. 4A illustrates one example of how the data stored in the alerts 285 can be as presented. The alerts 285 may be stored in a tabular format, where in table 400, each row identifies an alert for a ticket, where each alert is defined with the identifier of the ticket as tracked in the ticketing system 270, the name of the data center (e.g., X1 or X2, where X1 can be data center 210), a central component name associated with the experienced health issue, and a time stamp defining the time of the issue as acknowledged by the ticketing system.

In some implementations, the cloud platform environment 200 includes an alert aggregator 290 that provides detection logic 292 that can evaluate the alert data for the alerts 285 (for example, the table 400 of FIG. 4A) and aggregate the alerts based on their association with or relation to a central component, thereby allowing the system to determine a root cause ticket. For example, the number of alert entries (as in table 400 of FIG. 4A) associated with one central component can be determined, and that number can be evaluated based on a threshold value (e.g., defined on a general level for all components, defined per component, etc.) to determine whether a root cause ticket can be generated to combine some of the tickets in the ticketing system that correspond to the number of alert entries that are associated with a common central component. In this example, some of the alerts can be associated with tickets logged based on issues identified at one application for a first central component, and other alerts can be associated with tickets logged based on issued identified at another application for the same first central components. Both these sets of alerts associated with different application can be aggregated to determine a root cause ticket to combine the corresponding tickets for these alerts.

Figure 4B:
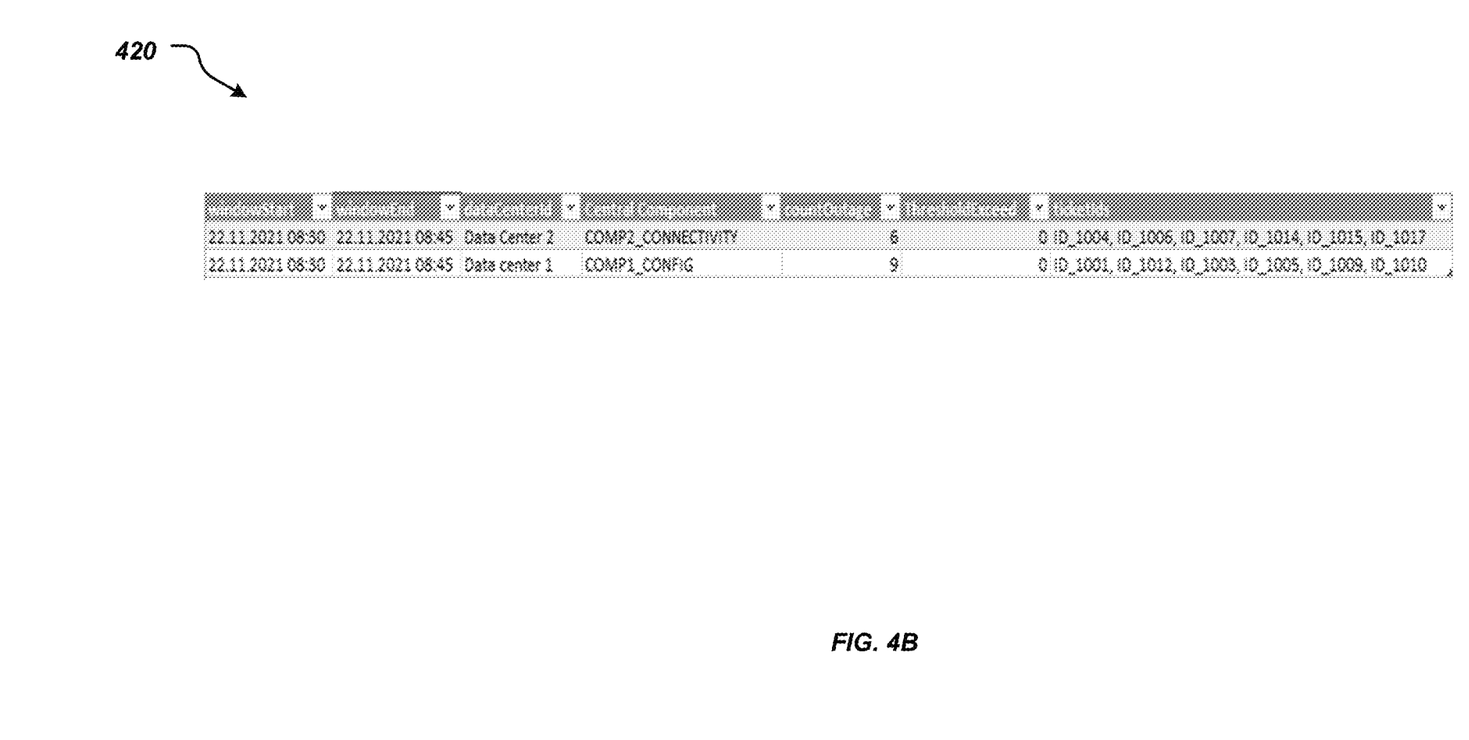
FIG. 4B is an example aggregated data set to be used to determine one or more root cause tickets that can be updated at respective ticketing systems of respective data centers in accordance with implementations of the present disclosure.

For example, FIG. 4B presents an example ticket data 420 representing an updated version of previous ticket data (not shown, but used to generate the alert data 400 of FIG. 4A) based on aggregations performed over alerts as presented at FIG. 4A. As shown, the ticketing system includes two root cause tickets that identify the data center and central component associated with the health status issue, as well as a number of entities that had tracked an experienced issue with those central component. Further, ticket data 420 can include references to original tickets, for example, and the initial ticket data can be maintained for further use. The data for the root cause tickets can be stored as a separate data set that is provided for further evaluation, and a determination of recovery jobs that may be executed for the identified central components.

For example, a threshold value of five (5) tickets per central component can be defined to be used to compare with a number of aggregated alerts associated with a single central component. In this example, if there are five (5) or more alerts associated with one central component that are logged for one or more applications, it may be predicted that the issue experienced by these one or more applications is due to an issue at the central component. The threshold number for determining whether a set of alerts can raise a root cause ticket can be determined empirically based on historical data and monitoring of tracked issues, or can be provided based on user input or other external service input.

Returning to FIG. 2, in some implementations, a ticketing system adapter 295 can be implemented to obtain aggregated alerts from the alert aggregator 290 and to use the root cause ticket at the ticketing system 270. In some implementations, the ticketing system adapter 295 can include the root cause ticket as a parent ticket to the tickets that correspond to the aggregated alerts (as per the detection logic 292). In some implementations, the ticketing system adapter 295 can use or identify the root cause ticket as a replacement ticket for the tickets that correspond to the aggregated alerts, and can remove the previously stored tickets. In this manner, the ticketing system adapter 295 can reduce the stored ticket data while maintaining a focus on issues that cause failures, disruptions, or any other form of poor performance of entities running on the data center 210 and on other data centers at the cloud platform environment that track their tickets at the ticketing system 270.

In some instances, ticket data from the ticketing system 270 can be pushed to the event capturing service 280 in batches. Those batches can be evaluated at the alert aggregator 290 and the ticketing system adapter 295 can perform actions at the ticketing system 270. In some instances, the ticketing system adapter 295 can further remove tickets that were logged at the ticketing system 270 while the alert aggregator 290 was processing a previous alert batch in an attempt to reduce processing of tickets (and alerts) associated with root causes that were already identified. Such removal of further tickets that were not pushed to the event capturing service 280 (and not processed can improve the timing of the ticket data processing as well as reduce the resources needed to process the ticket data.

In some implementations, the ticketing system 270 can be particular to the data center 210, while the event capturing service 280 can obtain data from multiple ticketing systems (substantially similar to the ticketing system 270) and create and evaluate alerts associated with the ticket data to determined root cause tickets that can be provided to relevant ticketing systems through ticketing system adapters such as the ticketing system adapter 295.

In some implementations, the data at the ticketing system 270 is used to identify further operations and/or actions to remedy issues at central components or at other entities running on the cloud platform environment 200. A root cause ticket that is created at the ticketing system 270 can be automatically or manually processed to perform a set of predefined actions to improve the state of the relevant central component. For example, the central component can be restarted, updated, or upgraded, or further health checks specific to the central component can be performed.

Figure 3:
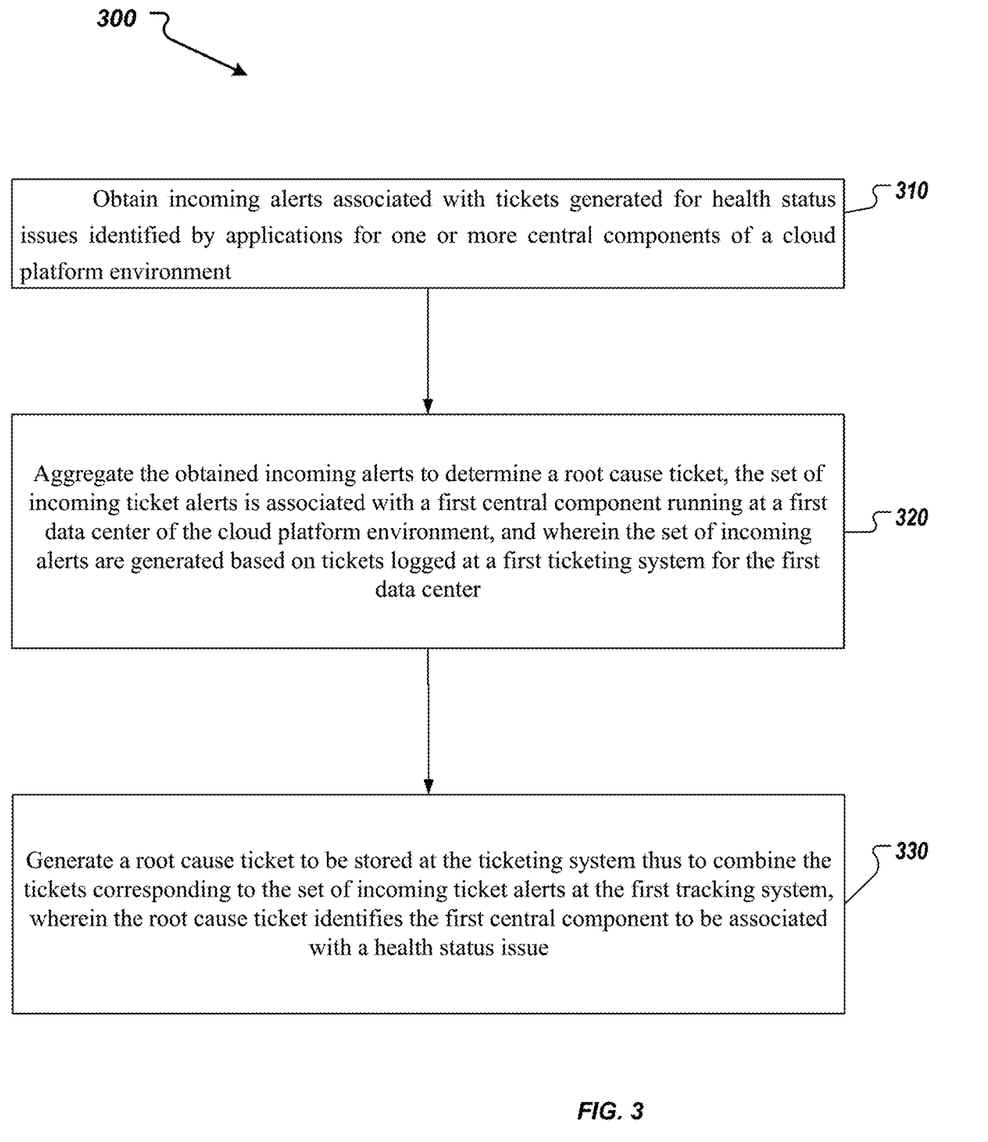
FIG. 3 is a flowchart for an example method for identifying root cause issues in central components running in the cloud platform environment in accordance with implementations of the present disclosure.

FIG. 3 is a flowchart for an example method 300 for identifying root cause issues in central components running in the cloud platform environment in accordance with implementations of the present disclosure. The example method 300 can be executed at the cloud platform environment 200 of FIG. 2.

At 310, incoming alerts associated with tickets generated for health status issues identified by applications for one or more central components of a cloud platform environment are obtained. In some instances, a ticket is logged at a ticketing system by an application to identify a health status issue for a central component running at a respective data center of the cloud platform environment where the application is running. The ticket can be logged at a ticketing system as described in FIG. 2.

In some instances, an application can log tickets for one or more central component that run on the same data center and are consumed by the application. For example, the application can log the ticket based on an executed health check (e.g., by a monitoring system such as the monitoring health check service 260) to determine the health status of the application. If the application relies on consumed resources or services from a central component, and that central component is experiencing disruptions (e.g., a network outage), the application would also experience disruptions that would result in failure of the health check and logging of a ticket for that central component.

In some instances, the incoming alerts can be obtained at 310 according to a predefined schedule for pulling data from one or more ticketing systems associated with the one or more data centers of the cloud platform environment.

In some instances, the one or more central components include at least one of a mail server, a data storage server, a communication service, and a document service, or other platform services as discussed at FIG. 2.

At 320, the obtained incoming alerts are aggregated to determine a root cause ticket. In some instances, a set of incoming alerts can be determined to be associated with a first central component running at a first data center from one or more data centers of the cloud platform environment. That set of incoming alerts can be generated based on a set of tickets logged at a first ticketing system of the first data center by one or more applications running on the first data center.

At 330, a root cause ticket is generated to be used at the first ticketing system. The root cause ticket combines the set of tickets corresponding to the set of incoming alerts, and can identify the first central component as associated with a first health status issue.

In some implementations, the first ticketing system of the first data center can be updated to store the root cause ticket as a primary ticket, and can link the primary ticket to the set of tickets associated with the aggregated alerts. In doing so, the tickets stored in the first ticketing system can be pushed as children into a hierarchical structure, and the root cause ticket can be defined as a parent in that hierarchical structure to be used for maintaining the ticket data.

In some implementations, the first ticketing system can be updated to store the root cause ticket as a primary ticket as a substitute for the set of tickets that were combined to form the root cause ticket. In some other implementations, the first ticketing system can store a separate data set for root cause tickets identified based on aggregation logic in accordance with the present implementations. In those instances, while the root cause tickets may be stored separately, the previously stored tickets can be filtered or managed to remove those tickets that are associated with the identified root cause tickets. For example, those associated tickets can be tickets that match alerts that were aggregated, or can also include other tickets that were not yet evaluated but are associated with the identified central components as identified in the root cause ticket list. Such division and filtering of data can support data processing efficiencies and storage space cost reduction.

In some instances, the root cause ticket(s) stored at the first ticketing system can be processed to determine recovery actions to be performed over respective central components. In some implementations, tickets for central components of the cloud platform can be continuously logged by applications for the same central components until the ticketing system stores a root cause ticket as an aggregation of tickets for the first central component. Thus, when one application acknowledges issues with one central component multiple times, multiple tickets would be logged and thus multiple alerts can be created. It should be appreciated that the time schedule for performing health checks to determine whether there are issues (and log tickets for those issues) and the schedule for obtaining alert data and performing aggregation may match or may be defined according to a different logic of aligning the schedules. In some cases, aggregation of even data can be performed based on execution of health checks for a substantially longer period that may allow at least some of the applications to perform a threshold number of health checks. For example, if one application logs consistently tickets for a central component, the probability that such central component is a root cause of the health issue of the application is higher compared to if only a single instance of a ticket is logged over an extended period of time. In some instances, it can be assumed that minor temporary disruptions would not create a number of tickets that would exceed a threshold number of tickets defined for a component to generate a root cause ticket.

In some implementations, root cause tickets can stay open (or maintained at the ticketing system) for a set number of hours, e.g., twenty-four (24) hours. This means that additional tickets of the same alert type (associated with the same central component can be appended to the root cause ticket at later stages, for example, based on further alert processing, within 24 hours after raising the initial root cause ticket.

Having a single root cause ticket instead of a potentially remarkably high number of individual tickets with the same underlying cause to be investigated support improved efficiency by reducing manual effort (or computational resources) for processing of individual tickets and well as the ticket time handling As previously described, FIG. 4A is an example data set 400 including data for alerts associated with different data centers and different central components in accordance with implementations of the present disclosure.

The table 400 includes entries that correspond to created alerts that correspond to tickets logged at a ticketing system, such as the ticketing system 270. At each row of the table 400, each alert is defined with the identifier of the ticket as tracked in the ticketing system 270, the name of the data center (e.g., X1 or X2, where X1 can be data center 210), a central component name that is associated with the experienced health issue, and a time stamp defining the time of the issue as acknowledged by the ticketing system.

As also previously described, FIG. 4B is an example aggregated data set 420 to be used to determine one or more root cause tickets that can be updated at respective ticketing systems of respective data centers in accordance with implementations of the present disclosure. The aggregated ticket data 420 can include reference to a central component that is associated with originally logged tickets by applications running on a data center, a number of applications that logged tickets for that central component. The data 420 can optionally include a reference to original tickets, for example, the initial ticket data. In some instances, the original ticket data can be maintained for further use and the data for the root cause tickets can be stored as a separate data set that is provided for further evaluation and determination of further execution of recovery jobs for the identified central components.

Figure 5:
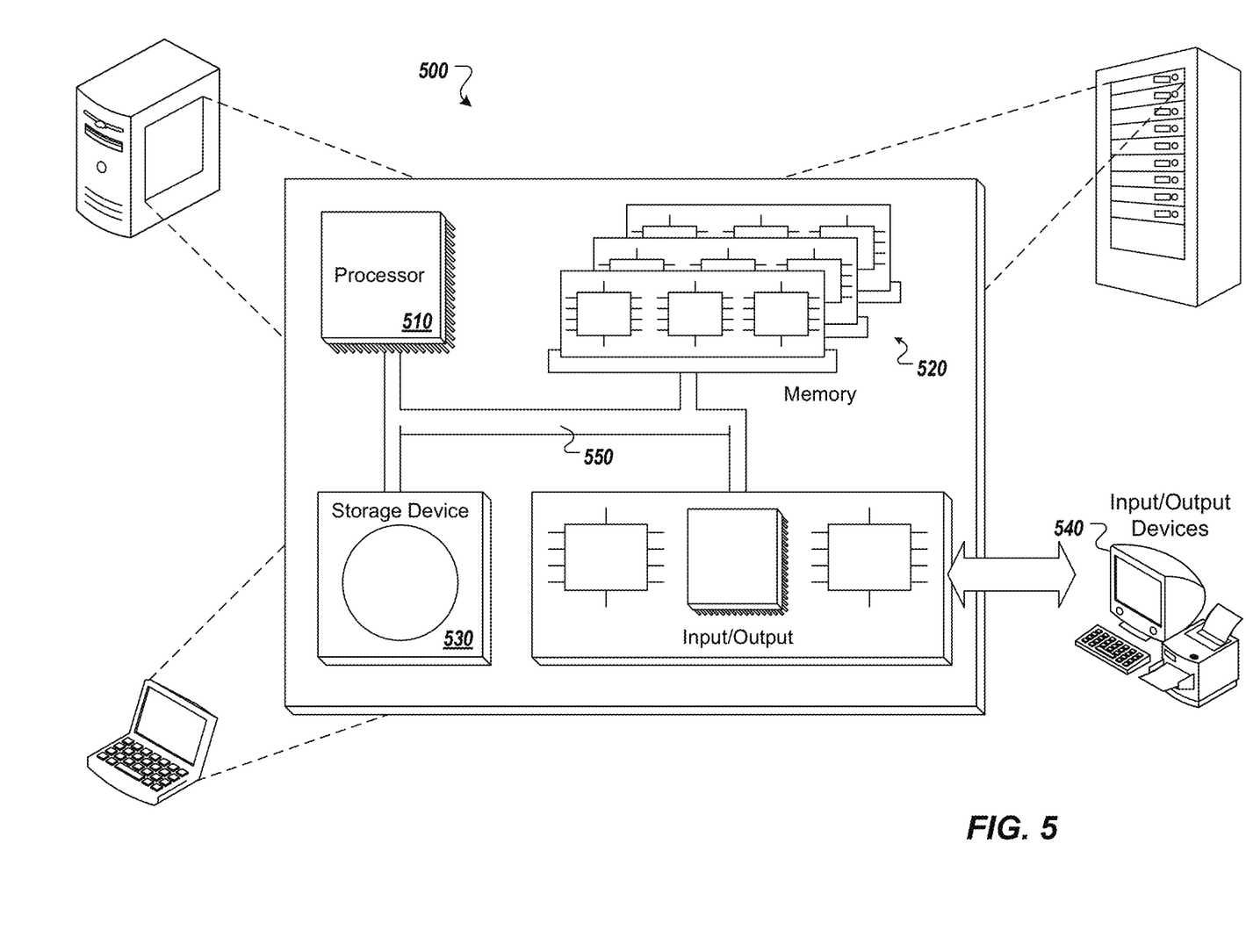
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, and 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Examples

Example 1. A computer-implemented method, the method comprising:
 obtaining incoming alerts associated with tickets generated for health status issues identified by applications for one or more central components of a cloud platform environment, wherein a ticket is logged at a ticketing system by an application to identify a health status issue for a central component running at a respective data center of the cloud platform environment where the application is running;
 aggregating the obtained incoming alerts to determine a root cause ticket, wherein a set of incoming alerts is associated with a first central component running at a first data center from one or more data centers of the cloud platform environment, and wherein the set of incoming alerts are generated based on a set of tickets logged at a first ticketing system of the first data center by one or more applications running on the first data center; and
 generating a root cause ticket to be used at the first ticketing system, wherein the root cause ticket is generated to combine the set of tickets corresponding to the set of incoming alerts, and wherein the root cause ticket identifies the first central component as associated with a first health status issue.

Example 2. The method of Example 1, comprising:
 logging tickets, by a first application running on the data center, for one or more central component that runs on the same data center as the first application, wherein at least a portion of the tickets are associated with the first central component,
 wherein the incoming alerts are obtained according to a predefined schedule for pulling data from one or more ticketing systems associated with the one or more data centers of the cloud platform environment.

Example 3. The method of any one of the previous Examples, wherein the one or more central components include at least one of a mail server, a data storage server, a communication service, and a document service.

Example 4. The method of any one of the previous Examples, comprising:
 logging, at the first ticketing system and by a first application running on the first data center, a ticket for an experienced network outage at a first central component based on failure in execution of an invoked service provided by the first central component running on the first data center.

Example 5. The method of any one of the previous Examples, wherein a ticket logged at a ticketing system includes data for an application that had logged the ticket and a central component of a respective data center that have the health status issue, and wherein the application, the ticket, and the central component are each identified in the data by respective unique identifiers.

Example 6. The method of any one of the previous Examples, wherein the obtained incoming alerts are aggregated to define one or more sets of incoming alerts, each set being associated with a common central component, when (i) the set of incoming alerts all identify the common central component as experiencing a health status issue and (ii) a number of the incoming alerts within the set exceeds a predetermined threshold value.

Example 7. The method of any one of the previous Examples, comprising:
    updating the first ticketing system of the first data center to store the root cause ticket as a primary ticket that is linked to the set of tickets, where the other tickets in the set of tickets are stored as child tickets in a hierarchical structure.

Example 8. The method of any one of the previous Examples 1 to 6, comprising:
    updating the first ticketing system of the first data center to store the root cause ticket as a primary ticket to substitute the set of tickets that were combined.

Example 9. The method of Example 8, comprising:
    processing the root cause ticket stored at the first ticketing system to perform recovery actions at the first central component.

Example 10. The method of any one of the previous Examples, comprising:
    continuously logging tickets for the first central component of the one or more components until the ticketing system stores a root cause ticket as an aggregation of tickets for the first central component.

Similar operations and processes as describes in Examples 1 to 10 may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 10 may also be contemplated.

What is claimed is:

1. A computer-implemented method, the method comprising:
    obtaining incoming alerts associated with tickets generated for health status issues identified by applications for one or more central components of a cloud platform environment, wherein a ticket is logged at a ticketing system by an application to identify a health status issue for a central component running at a respective data center of the cloud platform environment where the application is running;
    aggregating the obtained incoming alerts to determine a root cause ticket, wherein a set of incoming alerts is associated with a first central component running at a first data center from one or more data centers of the cloud platform environment, and wherein the set of incoming alerts are generated based on a set of tickets logged at a first ticketing system of the first data center by one or more applications running on the first data center; and
    generating a root cause ticket to be used at the first ticketing system, wherein the root cause ticket is generated to combine the set of tickets corresponding to the set of incoming alerts, and wherein the root cause ticket identifies the first central component as associated with a first health status issue.

2. The method of claim 1, comprising:
    logging tickets, by a first application running on the data center, for one or more central component that runs on the same data center as the first application, wherein at least a portion of the tickets are associated with the first central component,
    wherein the incoming alerts are obtained according to a predefined schedule for pulling data from one or more ticketing systems associated with the one or more data centers of the cloud platform environment.

3. The method of claim 1, wherein the one or more central components include at least one of a mail server, a data storage server, a communication service, and a document service.

4. The method of claim 1, comprising:
    logging, at the first ticketing system and by a first application running on the first data center, a ticket for an experienced network outage at a first central component based on failure in execution of an invoked service provided by the first central component running on the first data center.

5. The method of claim 1, wherein a ticket logged at a ticketing system includes data for an application that had logged the ticket and a central component of a respective data center that have the health status issue, and wherein the application, the ticket, and the central component are each identified in the data by respective unique identifiers.

6. The method of claim 1, wherein the obtained incoming alerts are aggregated to define one or more sets of incoming alerts, each set being associated with a common central component, when (i) the set of incoming alerts all identify the common central component as experiencing a health status issue and (ii) a number of the incoming alerts within the set exceeds a predetermined threshold value.

7. The method of claim 1, comprising:
    updating the first ticketing system of the first data center to store the root cause ticket as a primary ticket that is linked to the set of tickets, where the other tickets in the set of tickets are stored as child tickets in a hierarchical structure.

8. The method of claim 1, comprising:
    updating the first ticketing system of the first data center to store the root cause ticket as a primary ticket to substitute the set of tickets that were combined.

9. The method of claim 8, comprising:
    processing the root cause ticket stored at the first ticketing system to perform recovery actions at the first central component.

10. The method of claim 1, comprising:
    continuously logging tickets for the first central component of the one or more components until the ticketing system stores a root cause ticket as an aggregation of tickets for the first central component.

11. A non-transitory, computer-readable medium coupled to one or more processors and having instructions stored thereon which, when executed by the one or more processors, cause the one or more processors to perform operations, the operations comprising:
    obtaining incoming alerts associated with tickets generated for health status issues identified by applications for one or more central components of a cloud platform environment, wherein a ticket is logged at a ticketing system by an application to identify a health status issue for a central component running at a respective data center of the cloud platform environment where the application is running;
    aggregating the obtained incoming alerts to determine a root cause ticket, wherein a set of incoming alerts is associated with a first central component running at a first data center from one or more data centers of the cloud platform environment, and wherein the set of incoming alerts are generated based on a set of tickets logged at a first ticketing system of the first data center by one or more applications running on the first data center; and generating a root cause ticket to be used at the first ticketing system, wherein the root cause ticket is generated to combine the set of tickets corresponding to the set of incoming alerts, and wherein the root cause ticket identifies the first central component as associated with a first health status issue.

12. The non-transitory computer-readable medium of claim 11, comprising instructions which when executed by the one or more processors, cause the one or more processors to perform operations, comprising:
   logging tickets, by a first application running on the data center, for one or more central component that runs on the same data center as the first application, wherein at least a portion of the tickets are associated with the first central component,
   wherein the incoming alerts are obtained according to a predefined schedule for pulling data from one or more ticketing systems associated with the one or more data centers of the cloud platform environment.

13. The non-transitory computer-readable medium of claim 11, wherein the one or more central components include at least one of a mail server, a data storage server, a communication service, and a document service.

14. The non-transitory computer-readable medium of claim 11, comprising instructions which when executed by the one or more processors, cause the one or more processors to perform operations, comprising:
   logging, at the first ticketing system and by a first application running on the first data center, a ticket for an experienced network outage at a first central component based on failure in execution of an invoked service provided by the first central component running on the first data center.

15. The non-transitory computer-readable medium of claim 11, wherein a ticket logged at a ticketing system includes data for an application that had logged the ticket and a central component of a respective data center that have the health status issue, and wherein the application, the ticket, and the central component are each identified in the data by respective unique identifiers.

16. The non-transitory computer-readable medium of claim 11, wherein the obtained incoming alerts are aggregated to define one or more sets of incoming alerts, each set being associated with a common central component, when (i) the set of incoming alerts all identify the common central component as experiencing a health status issue and (ii) a number of the incoming alerts within the set exceeds a predetermined threshold value.

17. A system comprising a computing device; and a non-transitory, computer-readable medium coupled to the computing device and having instructions stored thereon which, when executed by the computing device, cause the computing device to perform operations, the operations comprising:
   obtaining incoming alerts associated with tickets generated for health status issues identified by applications for one or more central components of a cloud platform environment, wherein a ticket is logged at a ticketing system by an application to identify a health status issue for a central component running at a respective data center of the cloud platform environment where the application is running;
   aggregating the obtained incoming alerts to determine a root cause ticket, wherein a set of incoming alerts is associated with a first central component running at a first data center from one or more data centers of the cloud platform environment, and wherein the set of incoming alerts are generated based on a set of tickets logged at a first ticketing system of the first data center by one or more applications running on the first data center; and
   generating a root cause ticket to be used at the first ticketing system, wherein the root cause ticket is generated to combine the set of tickets corresponding to the set of incoming alerts, and wherein the root cause ticket identifies the first central component as associated with a first health status issue.

18. The system of claim 17, wherein the non-transitory, computer-readable medium has instructions which when executed by the computing device, cause the computing device to perform operations, comprising:
   logging tickets, by a first application running on the data center, for one or more central component that runs on the same data center as the first application, wherein at least a portion of the tickets are associated with the first central component,
   wherein the incoming alerts are obtained according to a predefined schedule for pulling data from one or more ticketing systems associated with the one or more data centers of the cloud platform environment.

19. The system of claim 17, wherein the one or more central components include at least one of a mail server, a data storage server, a communication service, and a document service.

20. The system of claim 17, wherein the obtained incoming alerts are aggregated to define one or more sets of incoming alerts, each set being associated with a common central component, when (i) the set of incoming alerts all identify the common central component as experiencing a health status issue and (ii) a number of the incoming alerts within the set exceeds a predetermined threshold value.

* * * * *